United States Patent [19]

Ungerer et al.

[11] Patent Number: 5,747,673
[45] Date of Patent: May 5, 1998

[54] METHOD FOR MEASURING WITH GREAT PRECISION THE VOLUME VARIATION OCCURRING WHEN FLUID PHASES MIX IN ORDER TO DETERMINE PHYSICO-CHEMICAL CHARACTERISTICS

[75] Inventors: Philippe Ungerer, Creteil; Jean-Fabrice Arnaud, Rueil-Malmaison, both of France

[73] Assignees: Institut Francais du Petrole, Rueil-Malmaison; Elf Aquitaine Production, Courbevoie, both of France

[21] Appl. No.: 720,010

[22] Filed: Sep. 27, 1996

[30] Foreign Application Priority Data

Sep. 28, 1995 [FR] France ............... 95 11546

[51] Int. Cl.$^6$ ............... G01N 33/20
[52] U.S. Cl. ............... 73/61.41; 73/61.76; 73/61.78
[58] Field of Search ............... 73/61.41, 61.43, 73/61.44, 61.46, 61.47, 19.1, 19.01, 19.05, 152.42, 152.18, 861.04, 61.76, 61.78

[56] References Cited

U.S. PATENT DOCUMENTS

| | | | |
|---|---|---|---|
| 4,395,902 | 8/1983 | Espenscheid et al. | 73/61.41 X |
| 4,401,575 | 8/1983 | Steward et al. | 73/61.41 X |
| 4,658,637 | 4/1987 | Ollivaud et al. | 73/61.41 X |
| 5,243,848 | 9/1993 | Cox et al. | 73/19.05 |
| 5,536,474 | 7/1996 | Ungerer et al. | 422/100 |

*Primary Examiner*—Hezron E. Williams
*Assistant Examiner*—Jay L. Politzer
*Attorney, Agent, or Firm*—Antonelli, Terry, Stout, & Kraus, LLP

[57] ABSTRACT

A containment cell with two chambers (7) in a thermostat-controlled enclosure (3) is used to measure separately, at determined pressure levels, the volumes occupied separately by fluid phases, prior to measuring at the same pressures the volume occupied by the mixture thereof, so as to deduce therefrom the excess volume ($v^E$) and the density of the mixture. By minimizing an error function (F) that takes account of volume quantities, such as the excess volume ($v^E$) or the density of the mixture, and of phase equilibrium data of the mixture such as the saturation pressures (Psat), these data being determined from said cell, it is possible to determine with precision the coefficients of the equation of state relating the thermodynamic parameters of the mixture (P, V, T) and thereby to fine down for example reservoir models. The method can be applied for study of petroleum fluids for example.

9 Claims, 7 Drawing Sheets

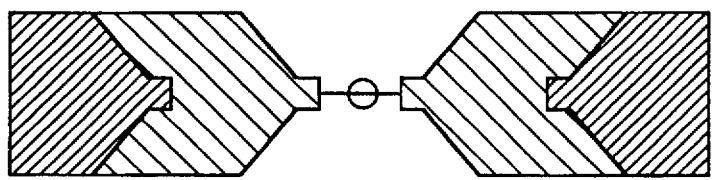
FIG. 2C
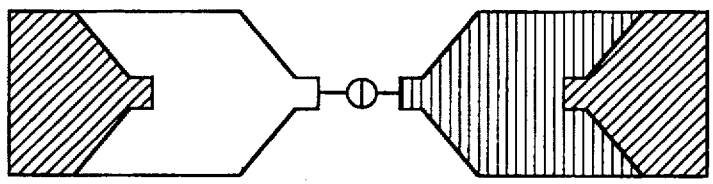
FIG. 2B
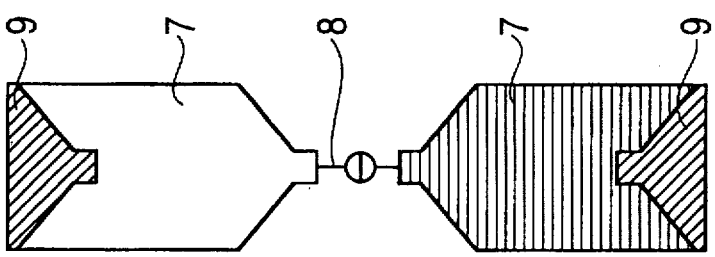
FIG. 2A
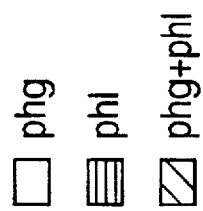

METHOD FOR MEASURING WITH GREAT PRECISION THE VOLUME VARIATION OCCURRING WHEN FLUID PHASES MIX IN ORDER TO DETERMINE PHYSICO-CHEMICAL CHARACTERISTICS

BACKGROUND OF THE INVENTION

1. Field of the Invention

The present invention relates to a method for measuring with great precision the volume variation occurring when fluid phases mix, as in mixtures of hydrocarbons for example, in order to determine physical-chemical characteristics and notably the density of these mixtures.

Notably density is an important quantity in many petroleum (estimation of reserves, production management, transportation, separations) and non petroleum domains. It is obvious that any improvement in the determination thereof has a great economic incidence.

2. Description of the Prior Art

Equations of state are the thermodynamic models that are currently most frequently used to calculate the volumetric properties and the phase equilibria of mixtures of several pure substances. The most commonly used among them are the cubic equations derived from the Van der Waals equation:

$$P = \frac{RT}{V-b} - \frac{a}{V^2 + ubV + wb^2} \tag{1}$$

where P denotes the pressure, T, the temperature, V, the molar volume, u and w are the characteristic parameters of the equation used, a, an attraction term and b, a co-volume, a and b being parameters depending on the composition of the fluid studied. The values of parameters u, w are respectively (0, 0) for Van der Waals, (2, −1) for Peng-Robinson and (1, 0) for Soave-Redlich-Kwong as it is known to specialists. Binary interaction parameters $k_{ij}$ in a quadratic mixture rule are widely used to define a, in a relation of the type as follows:

$$a = \sum_i \sum_j \sqrt{a_i a_j}\, (1 - k_{ij}) x_i x_j \tag{2}$$

where $x_i$ is the molar fraction of the pure substance i and $a_i$ the attraction parameter of the pure substance i.

A volume translation method allowing to improve the reproduction of the density of liquid or gaseous pure substances according to these equations is described by:

Peneloux A. et al. (1982), A consistent correction of Redlich-Kwong-Soave volumes, Fluid Phase Equilibria, 8, p.7–23.

Despite such improvements, calculation of the volumetric properties of simple mixtures (binary mixtures) or of complex mixtures, such as crude oils and natural gases, still leaves much to be desired. No conclusive improvements have been brought to the mixture rule used to calculate co-volume b. In most cases, a linear mixture rule is used:

$$b = \sum_i x_i b_i \tag{3}$$

where $x_i$ denotes the molar fraction of pure substance i in the mixture and $b_i$ the co-volume appearing in the equation of state of the pure substance i.

It has been attempted to improve this rule by replacing it by a quadratic rule:

$$b = \sum_i \sum_j x_i x_j b_{ij} \tag{4}$$

where $b_{ij}$ can be expressed in several ways by using an interaction parameter $l_{ij}$.

$$b_{ij} = \frac{b_i + b_j}{2} (1 - l_{ij}) \tag{5}$$

$$b_{ij} = (b_i^{1/3} + b_j^{1/3})^3 (1 - l_{ij}) \tag{6}$$

However, it is generally admitted that the mixture rules thus defined for parameter b provide no further improvement in relation to those supplied by improved rules for parameter a.

It is well-known that, in the case of a mixture of two liquid pure substances of molar fractions $x_1$ and $(1-x_1)$, the excess volume $V^E$ defined by the difference between the volume of one mole of mixture and the sum of the volumes of pure substances under the same temperature and pressure conditions can be measured according to the relation as follows:

$$V^E = V_m - x_1 V_1 - (1-x_1) V_2 \tag{7}$$

Such types of measurements are for example described in:

Katzenski G. et al (1982), Excess volumes of liquid n-alkane binaries from 10 to 200 MPa at 298.15 KJ, J. Chem. Thermodynamics, 14, p.801–802, or Ashcroft et al (1992), Volumetric behaviour of mixtures of crude oils and light hydrocarbons, J. of the Institute of Energy, Sep. 1992, 65, p.131–136.

However, determination of excess volumes has concerned so far only mixtures of liquids.

SUMMARY OF THE INVENTION

The method according the invention allows to determination with precision the volume variation or excess volume occurring when at least a liquid phase and at least a gas phase such as a petroleum fluid mixture for example, in order to determine physico-chemical parameters of the mixture, comprising using a containment cell placed in a thermostat-controlled enclosure that includes two independent chambers whose volumes can be modified by action of motive means, and valves for controlling communication between the two chambers, detectors for measuring with precision the volume variations of both chambers and pressure detectors for measuring the pressure prevailing respectively in each chamber.

The method is characterized in that the excess volume of the mixture is determined by means of the operations as follows:

a) the molar volumes of the liquid phase and of the gas phase are respectively determined, at the enclosure temperature, by feeding the two phases respectively into the two chambers, for different pressure levels in the chambers, obtained by action on the motive means, b) the valves are actuated and a homogeneous mixing of the phases is performed (by action on the motive means and preferably by maintaining the volume globally constant so as to keep a state of equilibrium), and c) the motive means are operated so as to obtain the previous different pressure levels, and the volume variations between the volume of the phases after mixing and the respective volumes of the two phases before mixing are measured by means of said detectors.

The density of the mixture can be determined from the measured excess volume values and it can be used to determine conveyance properties by achieving viscosity or interfacial tension models, etc.

Since thermodynamic parameters of the mixture are related by an equation of state by means of two interaction parameters depending on the mixture composition, these two parameters can be determined by minimizing an error function (F) taking account of volume quantities such as the excess volume or the density of the mixture, and of equilibrium data of the phases of the mixture such as the saturation pressures, these data being determined from the cell used. An error function of the form as follows is for example selected:

$$F = \frac{1}{n^E + n^{sat}} \left[ \sum_{p=1}^{n^E} \left| \frac{V_p^{Eexp} - V_p^{Emod}}{V_p^{Eexp}} \right| + \sum_{q=1}^{n^{sat}} \left| \frac{P_{satq}^{exp} - P_{satq}^{mod}}{P_{satq}^{exp}} \right| \right]$$

or $$F = \frac{1}{2} \left[ \frac{1}{n^E} \sum_{p=1}^{n^E} \left| \frac{V_p^{Eexp} - V_p^{Emod}}{V_p^{Eexp}} \right| + \frac{1}{n^{sat}} \sum_{q=1}^{n^{sat}} \left| \frac{P_{satq}^{exp} - P_{satq}^{mod}}{P_{satq}^{exp}} \right| \right],$$

where $n^E$ and $n^{sat}$ denote the number of experimental points of excess volume and of saturation pressures, and indices $^{exp}$ and $^{mod}$ denote the quantities measured and calculated by means of said equation of state.

In case of a complex mixture consisting of at least a gas phase and at least a heavier liquid phase, such as a high-pressure petroleum fluid, where the mixture has been separated by expansion into a gas phase and a liquid phase with determination of the constituents thereof, the method can comprise:

applying the equation of state separately to the gas phase and to the liquid phase, and determining volume translations ($c_i$) (notably that of the heavy fraction of the liquid phase) so as to reproduce at best the volume of the gas and liquid phases at said pressure levels, and applying the equation of state to the mixture, after correction of the interaction parameters depending on the density of the mixture, between the extreme constituents so as to represent at best the volume of the mixture ($V_m$) at said pressure levels.

The method according the invention allows to calculation more precisely of various physical-chemical parameters of mixtures under high pressure and temperature conditions, similar to those in which they are found, and notably the density thereof. The equation of state obtained by implementing the method according to the invention can be used to improve an underground reservoir simulator and to refine down material balances.

BRIEF DESCRIPTION OF THE DRAWINGS

Other features and advantages of the method will be clear from reading the description hereafter of non limitative examples, with reference to the accompanying drawings in which:

FIGS. 2a, 2b and 2c illustrate various stages of the use of the measuring cell.

DESCRIPTION OF THE PREFERRED EMBODIMENT OF THE INVENTION

Figure 1:
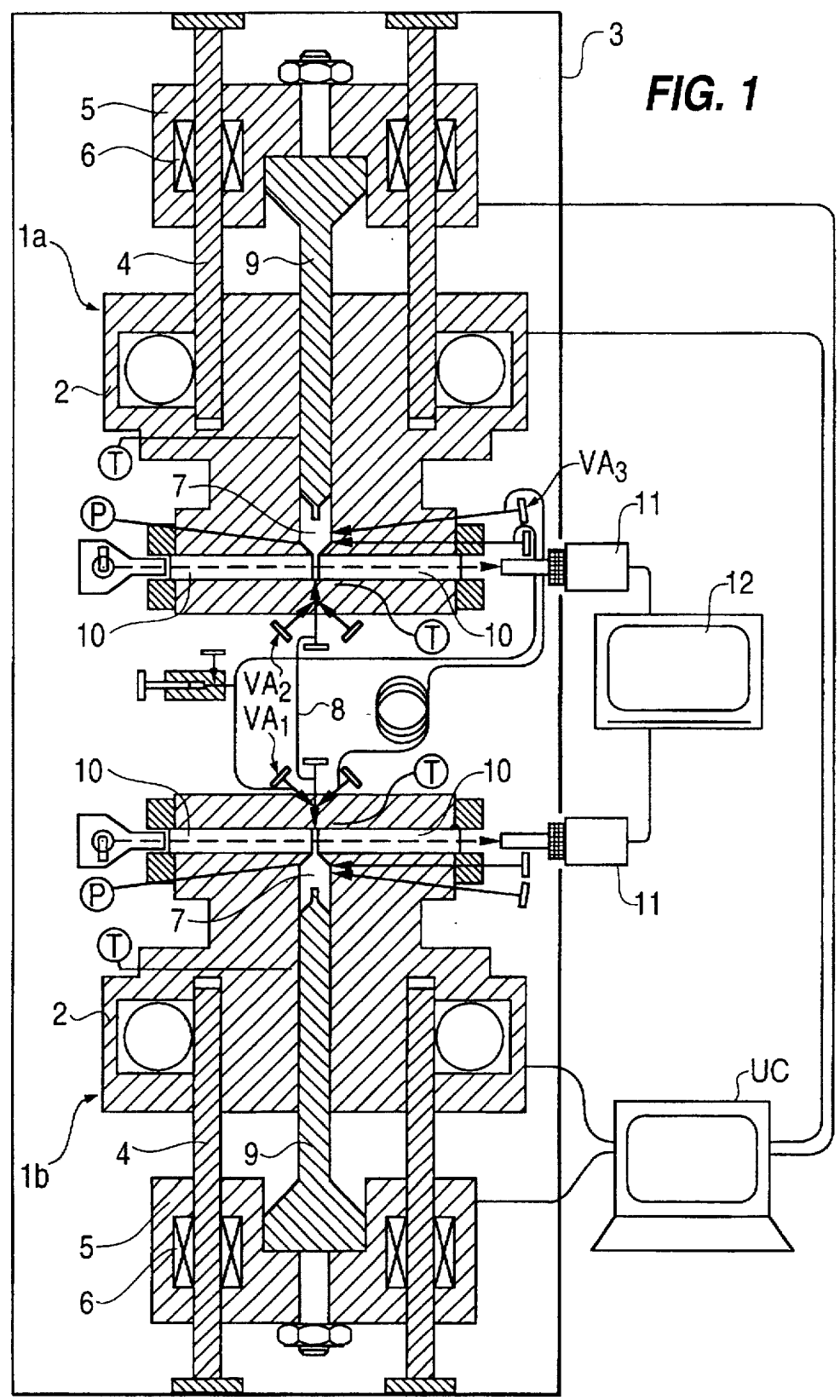
FIG. 1 diagrammatically shows a first cross-sectional view of the device in its thermostat-controlled enclosure.

The method according to the invention allows the determination with great precision the volume variation (excess volume $V^E$) occurring when a gas and a liquid mix, which mainly results in a substantial improvement in the calculation of the density of this mixture, by means of equations of state of the type of Equation (1). The method notably applies to high-pressure hydrocarbon mixtures.

Implementation of the method requires a device comprising a containment cell situated in a thermostatically-controlled enclosure, that includes two independent variable-volume chambers that can communicate with each other by means of valves. These two chambers are for example each delimited by a piston associated with motive means that can be placed outside the enclosure. The respective displacements of the two pistons must be controlled either separately or in synchronism, and each cell must be provided with a separate pressure detector. The device must preferably include means for measuring with precision the displacements of the two pistons, such as optical coders for example. Such a device allows the inner volume of each cell to be varied while providing a particularly fine measurement of this volume.

A device suited for the study of fluids at a high pressure (up to 150 MPa) and temperature (of the order of 200° C.) will be briefly described hereafter. This device includes (FIG.1) two separate cells 1a, 1b comprising each a rigid body 2 suited for being fastened inside a thermostat-controlled enclosure 3. Each rigid body comprises guide housings for two ball threaded rods 4 laterally spaced out and freely rotating on themselves. For better guidance, each body 1 can comprise four housings for four threaded rods distributed in squares. The two or four rods 4 are interconnected to enclosure 3 in translation. A hanger 5 secured to a nut 6 immobilized in rotation, provided with a thread suited to that of rods 4, is associated with each threaded rod. The vertical translation of hangers 5 is obtained by bringing these threaded rods 4 respectively into rotation.

A cylindrical chamber 7 with a conical bottom or end is provided through each cell body 1. They communicate with each other through a supple duct 8 fastened between the respective points thereof. Arrays of valves VA1, VA2, VA3 allow introduction of the substances to be analyzed and direct or indirect transfers between the two chambers. Two pistons 9 provided each with a conical end suited to the shape of the two chambers 7 slide in these two chambers. Pistons 9 are respectively secured to the mobile hangers 5 associated with each series of rods 4. Each one of them is provided with a seal (not shown) in the neighbourhood of the point thereof.

The device includes two optical display equipments allowing the point of each of the two chambers 7 to be observed. Each optical equipment includes two transparent cylindrical blocks 10 running through each cell body at the level of the point of each chamber, and an optical system including a video camera 11 associated with a video monitor 12. The particular tapered-beak configuration of the transfer zone at the point of each of the chambers 7 allows a very great precision to be obtained in all the transfer operations that may be performed on the fluids. This is particularly the case when all of the gas phase of a two-phase substance under pressure is to be drawn off with precision in one of chambers 7 to feed it into the other. The device further comprises temperature detectors T and pressure detectors P.

The threaded rods 4 of each series of rods are rotated by gears coupled with motive means (not shown). The device also comprises a microcomputer-driven control unit UC programmed to control transfers between the two cell bodies.

The method can also be implemented by using devices such as those described for example in the assignee's French patents 2,666,415 and 2,176,837.

The following stages are successively carried out to determine the volume variation occurring when a gas and a liquid mix, by means of the method according to the invention:

1) The two chambers 7 being isolated from each other by valves VA1-VA2, the gas phg is fed into one of the chambers and the liquid phl into the other (FIG.2a). The desired pressure can be reached in each chamber by changing the position of pistons 9. This procedure allows the obtaining of the molar volumes of the fluid phases $V_1$ and $V_2$ that appear in Equation (7), at the temperature of the enclosure, for different pressure levels $P_i$ (FIG.2b).

2) Once the molar volumes of each fluid phase have been determined, the valves isolating chambers 7 from each other are opened. Successive transfers are performed between the two chambers 7 through tube 8 that connects them by action on pistons 9, so as to achieve a homogeneous mixing (phg+phl) of the gas phase and of the liquid phase. Mixing is preferably performed at globally constant volume (of the two chambers) so as to keep the initial state of equilibrium. If $n_1$ and $n_2$ are the initial numbers of moles of the fluid phases phg and phl in the respective chambers thereof, the global concentration $x_1$ is obtained by:

$$x_1 = \frac{n_1}{n_1 + n_2} \quad (8)$$

Equation (7) becomes:

$$(n_1+n_2) V^E = (n_1+n_2) V_m + n_1 V_1 + n_2 V_2 \quad (9)$$

i.e., by introducing the experimental volumes:

$$v_1 = n_1 V_1, \; v_2 = n_2 V_2, \; v_m = (n_1+n_2) V_m \text{ et } v^E = (n_1+n_2) V^E \; v^E = v_m - v_1 - v_2 \, (10)$$

3) The volume of chambers 7 allowing to obtain the same pressure level $P_i$ as that at which the volumes of the fluid phases were determined is sought so as to determine the mixture volume $v_m$ that allows the calculation of the excess volume at this pressure (FIG.2c).

The excess volume $v^E$ being obtained through the difference of two terms having very close values, it is essential to limit greatly errors made when determining it. This is one of the important advantages inherent in the method according to the invention. A relative error about volumes is in fact the sum of a systematic error $_s$ and of an accidental error $_a$.

Since the chambers are identical and the mixture volume $v_m$ is obtained by adding the volumes of the two chambers, it may be considered that, by first approximation, the systematic uncertainties $_s$ are similar. The remaining relative error therefore comprises the accidental errors and the systematic error differences between the two chambers. It can be shown, by means of an error calculation, that the systematic error only applies to the excess volume and that only the accidental errors add up. In practice, the maximum systematic error $_s$ is estimated at 1.5%, which is the maximum difference that has been observed by measuring the difference between the measured density of methane and that deduced from a reference equation accurate to 0.2%. This systematic error is due to imperfections in the calibration of volumes (notably of the expansion coefficient) and in the pressure detectors and temperature probes.

On the other hand, the accidental error, that has been estimated from the reproducibility of volume readings, is much lower : at most 0.03 cm³ for a compressible fluid (gas) and less than 0.01 cm³ for a liquid. An accidental relative error less than 0.1% is for example reached for a volume of 30 cm³, which is representative of the volumes used in practice with the cell schematized in FIG.1. The accidental error $_a$ is thus much lower than the systematic error $_s$, which leads to a moderate total error about $v^E$. This is illustrated by the example as follows:

|  | $\delta_S = 1,5\%$ | |
|---|---|---|
| Gas | $v_1 = 30 \text{ cm}^3$ | $\delta_a (v_1) = 0.1\%$ |
| Liquid | $v_2 = 30 \text{ cm}^3$ | $\delta_a (v_2) = 0.03\%$ |
| Mixture | $v_m = 57 \text{ cm}^3$ | $\delta_a (v_m) = 0.1\%$ |
| i.e. | $v^E = -3 \text{ cm3}$ | |

The absolute uncertainty about the measurement of the excess volume ($v^E$) is thus equal to 0.14 cm³. The relative uncertainty about the excess volume ($v^E$)/$v_E$ is thus of the order of 4% in this example.

Figure 3:
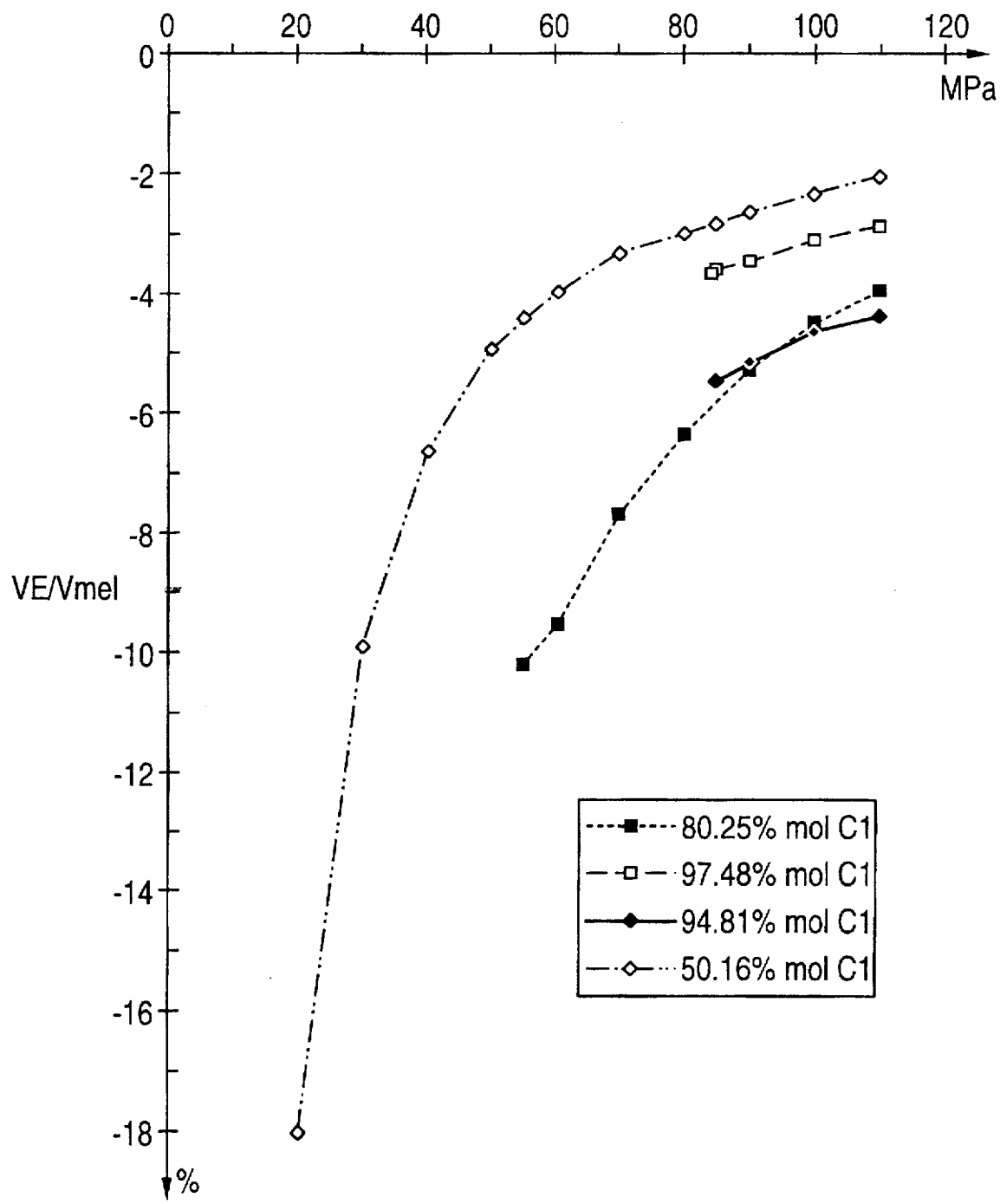
FIG. 3 shows, at constant temperature, an example of variation, as a function of the pressure, of the ratio of the excess volume to the volume of a mixture Cl-nC24.

The method according to the invention has been tested for example on a contrasting mixture (methane-n-tetracosane) and has led to coherent excess volume values $v^E$ in the pressure range studied (20 to 110 MPa). In this example, the excess volumes observed at 100.9° C. (FIG.3) are greater by one or two orders of magnitude than those obtained by applying prior methods to mixtures of liquid n-alkanes. In particular, it has been observed that the excess volume is far from being negligible at high pressure (1,100 bar).

Once the excess volumes have been measured, the saturation pressures or, which amounts to the same thing, the composition of the gas and liquid phases can be calculated by means of the Hall et al method described for example in the document as follows:

Hall K. R. et al (1975), A new technique for collecting binary vapour-liquid equilibrium data without measuring composition : the method of intersecting isochores, AIChE J., Vol. 21, No. 6, p. 1111–1114, and some experimental results (FIG.4) obtained for some concentration values can be corroborated by visual observation by means of optical systems 10 (FIG.1).

Use of excess volumes for improving equations of
state for a binary mixture

With the linear mixture rule for co-volumes defined by Relation (3), the excess volume $v^E$ calculated with the equation of state tends to zero when the pressure tends to infinity as a result of the molar volume tending to the co-volume of the equation of state. It has been established that this is not true for high pressures.

Figure 4:
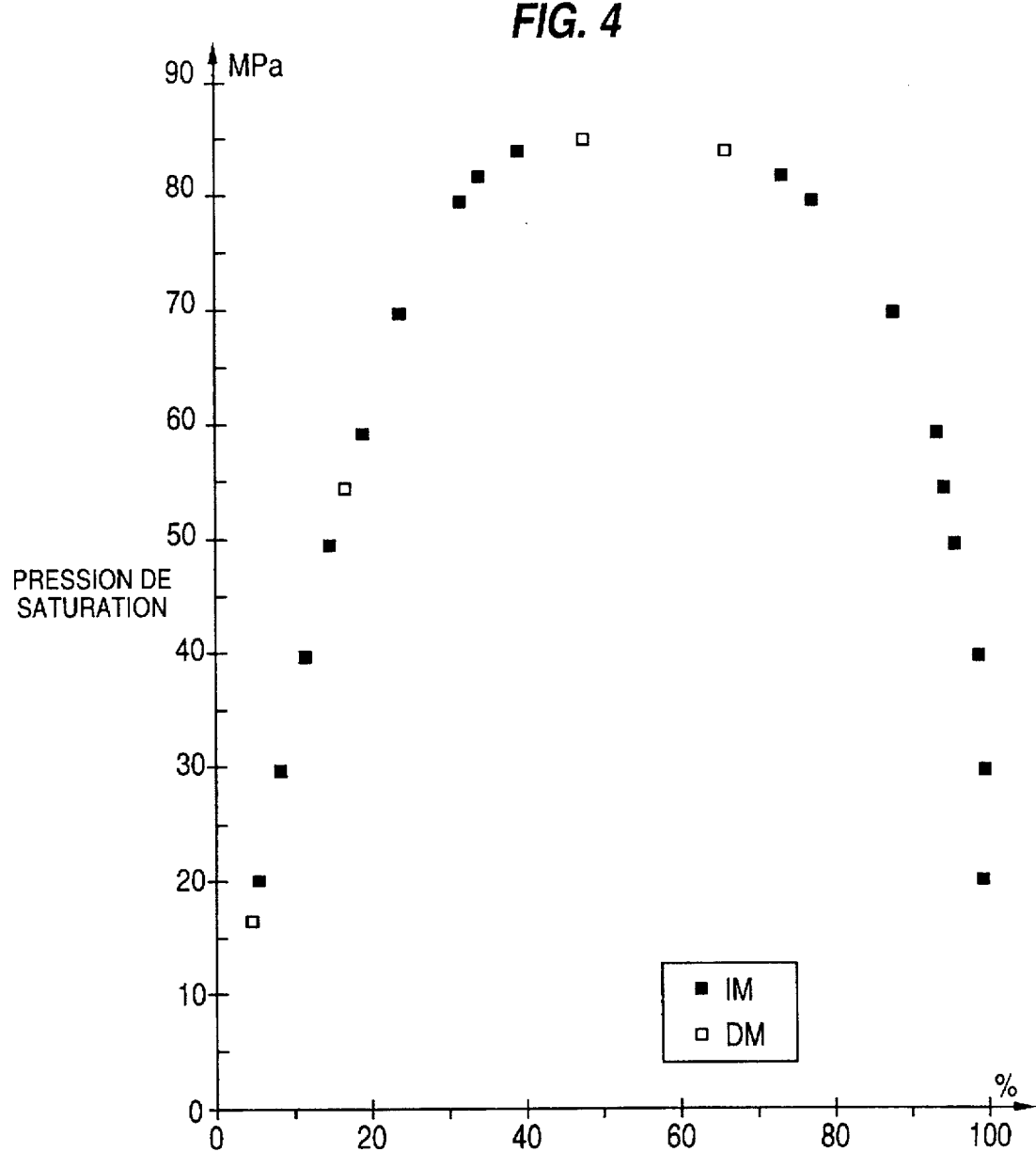
FIG. 4 shows an example of variation of the saturation pressure of the same mixture with the constituent Cl mass concentration, with values (IM) indirectly obtained by the method known as Hall et al method and with values (DM) directly obtained by visual observation using a test cell.

Representation of the effective results obtained is therefore preferably achieved by selecting a mixture rule such as that of Equation (4), while making sure however that the reproduction of the excess volumes $v^E$ by means of this quadratic mixture rule is not achieved to the detriment of that of the saturation pressures of FIG. 4.

Figure 5:
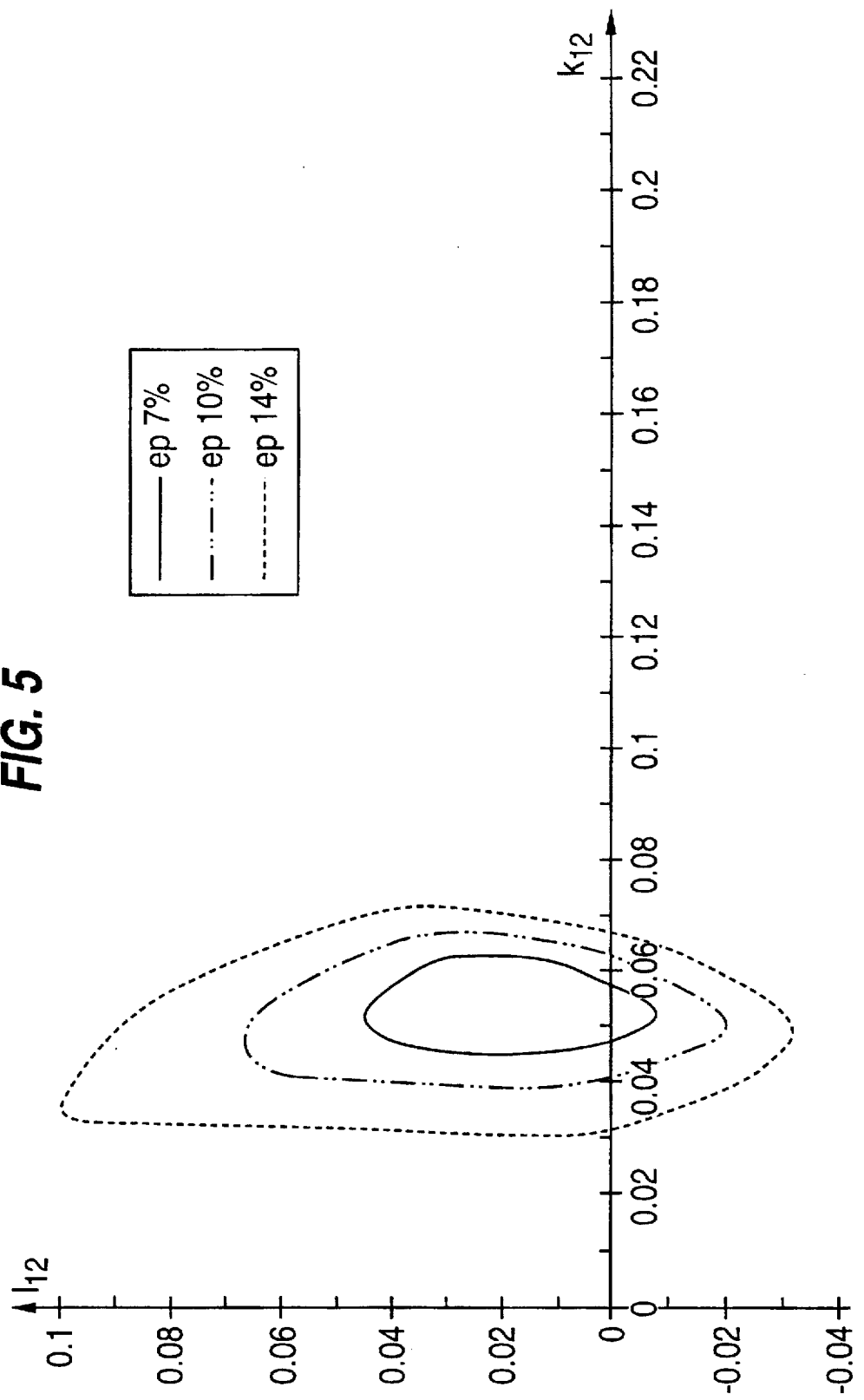
FIG. 5 shows a first mistie map obtained by solving a conventional error function.

It is well-known to draw up a mistie map in a two-dimensional diagram by laying off as the abscissa the coefficients k12 and as the ordinate the coefficients 112, graphically representing the variations of an objective function f representative of the mean relative error of the equation of state, that takes account of phase equilibrium data. However, it is well-known that, as shown in figure 5 obtained from the Peng-Robinson equation of state, the mistie map (ep representing the percentage of error) shows no localized optimum for the value of 112 whereas the value of k12 is well determined.

The method according to the invention comprises selecting an objective function taking into account both volume quantities such as the excess volume $v^E$ or the density of the mixture and phase equilibrium data such as the saturation pressures. A function F defined by the relation as follows is for example selected:

$$F = \frac{1}{n^E + n^{sat}} \left[ \sum_{p=1}^{n^E} \left| \frac{V_p^{Eexp} - V_p^{Emod}}{V_p^{Eexp}} \right| + \sum_{q=1}^{n^{sat}} \left| \frac{P_{satq}^{exp} - P_{satq}^{mod}}{P_{satq}^{exp}} \right| \right] \quad (11)$$

or $$F = \frac{1}{2} \left[ \frac{1}{n^E} \sum_{p=1}^{n^E} \left| \frac{V_p^{Eexp} - V_p^{Emod}}{V_p^{Eexp}} \right| + \frac{1}{n^{sat}} \sum_{q=1}^{n^{sat}} \left| \frac{P_{satq}^{exp} - P_{satq}^{mod}}{P_{satq}^{exp}} \right| \right] \quad (12)$$

where $n^E$ and $n^{sat}$ denote the number of experimental points of excess volumes and of saturation pressures, and indices $^{exp}$ and $^{mod}$ denote the quantities measured and calculated by means of the equation of state considered.

This function F represents the mean relative error of the equation of state for the calculation of the excess volumes $v^E$ and of the saturation pressures under the experimental conditions selected. Minimization of the objective function F is achieved by means of two variables that are the interaction parameter $l_{ij}$ from which $b_{ij}$ is expressed in Equation (5) and the interaction parameter $k_{ij}$ appearing in the mixture rule defined by Relation (2).

It can be shown, by drawing up a mistie map corresponding to this completed objective function F (figure 6), that the precision relative to coefficients $l_{ij}$ for a given margin of error is greatly improved, without the precision relative to coefficients $k_{ij}$ being substantially affected thereby if we compare it with that of figure 5.

Figure 6:
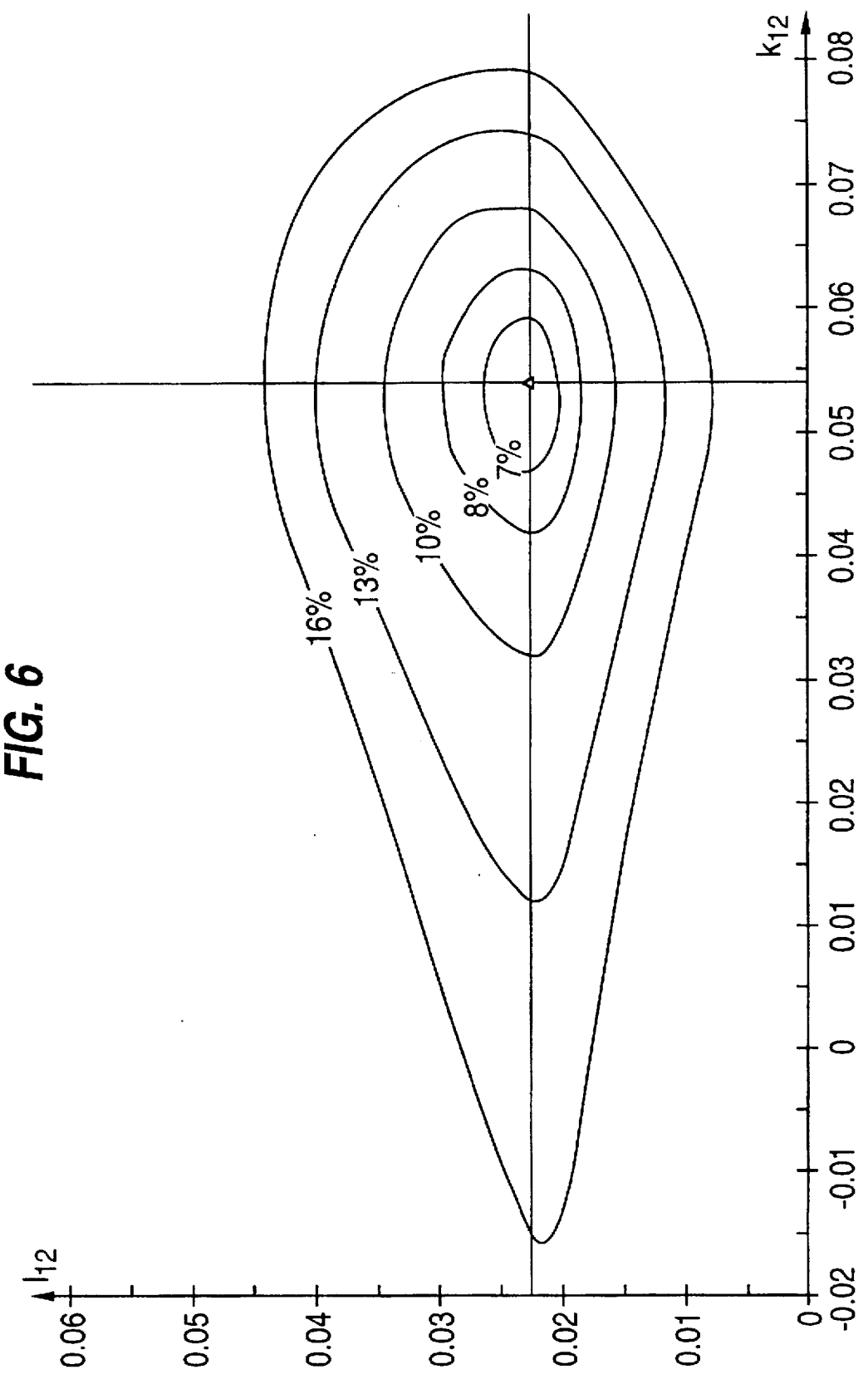
FIG. 6 shows, by comparison, another mistie map obtained by solving a particular error function selected within the scope of the method.

FIG. 6 shows the values taken by the objective function F according to the binary interaction parameters 112 and k12, by using the Peng-Robinson equation of state. This "mistie map" exhibits an optimum for 112 =0.0225 and k12 =0.0541. For these values, function F equals 6.5%. Examining the values taken by criterion F along the abscissa axis, i.e. for 112 =0, which corresponds to the case of an objective function such as the previous function F that only takes account of the saturation pressures, shows that they all greatly exceed 16%.

It thus appears that using the quadratic mixture rule on parameter b (which compels to take account of parameter 112 (see relation (4)) allows the improvement considerably of the reproduction of the volumetric measurements in relation to the linear rule. It may be seen in figure 7 that the curve drawn up for the value 112 determined by means of the objective function F selected is in accordance with the experimental results. It may be checked that the changes brought to interaction parameter k12 have a very slight effect on the calculated excess volumes.

It has been checked that the interaction parameter 112 determined from excess volumes $v^E$ applies to any of the equations of state of the type of Equation (1). The minimum value of objective function F (Equation (13)) is well defined, for example, with the Soave-Redlich-Kwong equation. The minimum co-ordinates (112 =0.0213 and k12 =0.0473) are close to those found for the previous Peng-Robinson equation.

Figure 7:
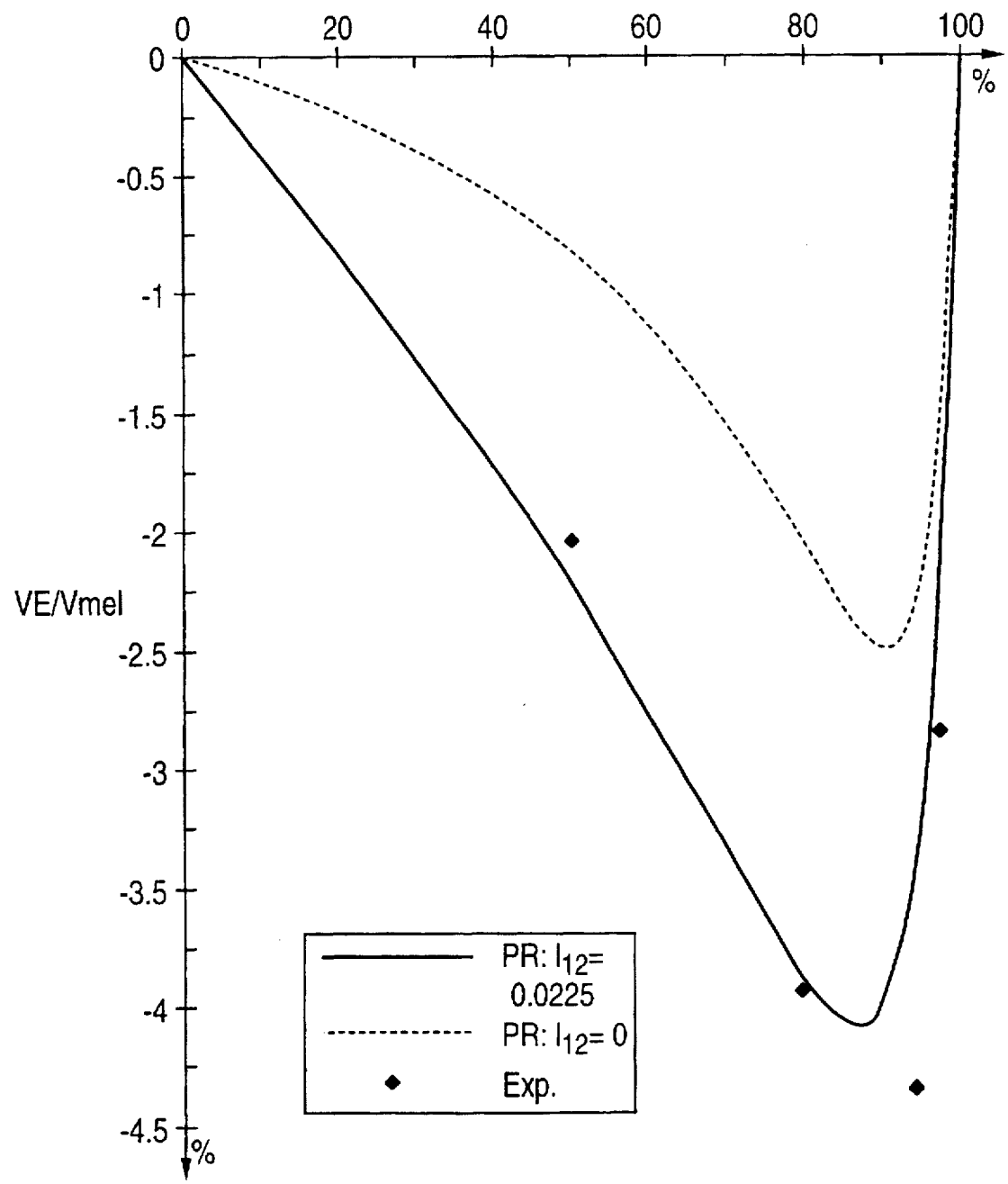
FIG. 7 shows examples of variation with the Cl concentration, at constant pressure, of the ratio of the excess volume to the ratio of a mixture Cl-nC24.

As can be seen from the experimental values EXP in FIG. 7, adopting the quadratic mixture rule with the parameter 112 thus defined (112 =0.0225) leads to an improvement whose size reaches 0.02 cm$^3$ per cm$^3$ of mixture in relation to the linear mixture rule 112 =0. Besides, the volume translation described by Peneloux et al in the above-mentioned document can be used to optimize the reproduction of the molar volume of the pure substances by means of the equation of state. It may be noticed that this volume translation of the pure substances has no effect on the excess volume $v^E$ if the linear weighting rule selected within the scope of the present method is used for the translation parameter.

$$c = \sum_i x_i c_i \quad (13)$$

where c is the volume translation of the mixture and $c_i$ is the volume translation of the pure substance i.

The greater precision introduced in the calculation of excess volume $v^E$ is translated into an equivalent improvement in the calculation of the volume Vm of the mixture. The precision reached in case of a contrasting binary mixture, for example, can be higher than 0.02 cm$^3$ per cm$^3$ of mixture.

The method according to the invention can apply to other binary mixtures. It allows to obtain sets of parameters 112 leading to improvements of the same type for the calculation of the volumetric properties of multi-constituent mixtures.

Extension of the method to complex mixtures

Analysis of the methane-n-tetracosane binary mixture allows the prediction that, in the case of complex mixtures, the same phenomenon must occur if the fluid contains both gases (methane, nitrogen, hydrogen, etc.) and heavier constituents. This is the case in particular of high-pressure petroleum fluids.

It is assumed that the fluid has been separated into a gas phase G and a liquid phase L (for example by expansion at atmospheric pressure) whose compositions are known by means of suitable analysis techniques. The following step is proposed to obtain an equation of state correctly representing the volumetric behaviour of the fluid at a given temperature. It consists in:

1) feeding the gas G into a chamber of a device of the type shown in figure 1, and the liquid L into the other chamber, the latter being isolated from the first one, 2) measuring the molar volumes of the gas ($v_G$) and of the liquid ($v_L$) at different pressure levels, 3) communicating the two chambers, 4) measuring the global volume $v_m$ at the same pressure levels as those selected at 2), 5) applying the equation of state separately to the gas G and to the liquid L, and in determining the volume translation $c_i$ of the heavy constituents so as to reproduce at best the volume of the liquid phase L at the different pressures.

6) applying the equation of state to the global fluid and optionally in correcting the interaction parameter(s) $l_{ij}$ between the extreme constituents so as to represent at best the volume of the mixture ($v_m$) at the different pressures. For example, for a petroleum fluid, the interaction parameter $l_{ij}$ will be corrected between the methane and the heavy fraction.

When applied to petroleum fluids, this method thus allows the representation of both the density of the stored crude and that of the fluid containing the dissolved gas under reservoir conditions. By analogy with the case of the methane-n-tetracosane mixture, an improvement of several per cent may be expected for the density calculations. Calculation of the phase equilibria, which is little dependent on the interaction parameters $l_{ij}$, can be achieved independently by means of conventional procedures.

Another application of the method to complex mixtures consists for example in determining the interaction parameters $l_{ij}$ between light pure substances (methane, nitrogen, hydrogen, ethylene, etc.) and petroleum cuts. This determination can be achieved on the basis of excess volume measurements between each light pure substance and representative petroleum cuts. Once parameters $l_{ij}$ have been determined for the main light substance-petroleum cut pairs, a predictive model is obtained that is applicable on the mere basis of a distillation curve of the fluid to be modelled or of any equivalent composition analysis. This model allows the density prediction to be significantly improved without requiring excess volume measurements on the complex mixtures studied.

The more precise equation of state obtained by implementing the method according to the invention can be used to improve an underground reservoir simulator and to fine down the material balance. An example of use of an equation of state in flow simulators is for example described in the document as follows:

Killough J. E. et al, 1987, Fifth Comparative Solution Project: Evaluation of Miscible Flood Simulators, in SPE 16000.

The method according to the invention can be used in the field of chemical engineering to simulate processes using equations of state to calculate phase equilibria and to achieve material balances.

I claim:

1. A method for determining with precision a volume variation or excess volume ($v^E$) occurring when at least a liquid phase and at least a gas phase of a fluid mixture for determining physical-chemical parameters of the mixture, comprising using a containment cell placed in a thermostatically-controlled enclosure, including two independent chambers whose volumes can be modified by action of a motive means, and valves for controlling communication between the two chambers, detectors for measuring with precision volume variations of the two chambers and pressure detectors for measuring pressure respectively within the two chambers, wherein the excess volume ($v^E$) is determined by means of the steps:

a) molar volumes of respectively the liquid phase and the gas phase are determined, at an enclosure temperature, by feeding the gas and liquid phases respectively into the two chambers, for different pressure levels in the chambers obtained by action on the motive means, b) the valves are actuated and a homogeneous mixing of the phases is performed, and c) the motive means is operated so as to obtain the different pressure levels, and the volume variations between the volume of the gas and liquid phases after mixing and respective volumes of the two phases prior to mixing are measured by means of the detectors.

2. A method as claimed in claim 1, wherein a density of the mixture is determined from values of excess volume ($v^E$).

3. A method as claimed in claim 1, wherein thermodynamic parameters of the mixture (P, V, T), related by an equation of state by means of two interaction parameters (a, b) depending on a composition of the mixture, are determined by minimizing an error function (F) taking into account volume quantities including the excess volume ($v^E$) or a density of the mixture and phase equilibrium data of the mixture including saturation pressures (Psat) are determined from the containment cell.

4. A method as claimed in claim 3, wherein the error function (F) is:

$$F = \frac{1}{n^E + n^{sat}} \left[ \sum_{p=1}^{n^E} \left| \frac{V_p^{Eexp} - V_p^{Emod}}{V_p^{Eexp}} \right| + \sum_{q=1}^{n^{sat}} \left| \frac{P_{satq}^{exp} - P_{satq}^{mod}}{P_{satq}^{exp}} \right| \right]$$

or $$F = \frac{1}{2} \left[ \frac{1}{n^E} \sum_{p=1}^{n^E} \left| \frac{V_p^{Eexp} - V_p^{Emod}}{V_p^{Eexp}} \right| + \frac{1}{n^{sat}} \sum_{q=1}^{n^{sat}} \left| \frac{P_{satq}^{exp} - P_{satq}^{mod}}{P_{satq}^{exp}} \right| \right]$$

where $n^E$ and $n^{sat}$ denote a number of experimental points of excess volumes and of saturation pressures, and indices $^{exp}$ and $^{mod}$ denote quantities measured and calculated by means of the equation of state.

5. A method as claimed in claim 4, applicable to a complex mixture ($v_m$) consisting of at least a gas and at least a heavier liquid phase including separation of the mixture by expansion into a gas phase and a liquid phase with determination of the compositions thereof, comprising:

applying an equation of state separately to the gas phase and to the liquid phase, and determining a volume translation ($c_i$) so as to reproduce a volume of the gas or liquid phases at the pressure levels, and applying the equation of state to the mixture, after correction of the interaction parameters depending on the mixture density, between extreme constituents in order to represent a volume of the mixture ($v_m$) at the pressure levels.

6. A method as claimed in claim 5, wherein the volume translation ($c_i$) of a heavy fraction of the liquid phase is determined.

7. A method as claimed in claim 1, wherein homogeneous mixing of the phases is achieved at a constant global volume by action on the motive means.

8. An application of the method as claimed in claim 1, to petroleum fluids in an underground reservoir flow simulator.

9. An application of the method as claimed in claim 1, wherein a process is simulated using equations of state to calculate phase equilibrium and to achieve material balance.

* * * * *